United States Patent
Appel et al.

(10) Patent No.: US 11,126,957 B2
(45) Date of Patent: Sep. 21, 2021

(54) SUPPLY CHAIN FORECASTING SYSTEM

(71) Applicant: INTERNATIONAL BUSINESS MACHINES CORPORATION, Armonk, NY (US)

(72) Inventors: Ana Paula Appel, São Paulo (BR); Igor Cerqueira Oliveira, São Paulo (BR); Marisa Affonso Vasconcelos, São Paulo (BR); Ricardo Vieira Borges Franco, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/176,962

(22) Filed: Oct. 31, 2018

(65) Prior Publication Data
US 2020/0134545 A1     Apr. 30, 2020

(51) Int. Cl.
*G06Q 10/08* (2012.01)
*G06Q 10/04* (2012.01)
(Continued)

(52) U.S. Cl.
CPC ............. *G06Q 10/087* (2013.01); *G06N 3/08* (2013.01); *G06N 20/00* (2019.01); *G06Q 10/04* (2013.01); *G06Q 10/0635* (2013.01)

(58) Field of Classification Search
CPC .. G06Q 10/087; G06Q 10/04; G06Q 10/0635; G06N 20/00
(Continued)

(56) References Cited

U.S. PATENT DOCUMENTS 5,521,813 A    5/1996   Fox et al.
6,963,853 B1  11/2005   Smith
(Continued)

FOREIGN PATENT DOCUMENTS

WO    2008124598    10/2008

OTHER PUBLICATIONS

Disclosed Anonymously, "Supply Chain Risk Control based on Time-To-Recovery Model", An IP.com Prior Art Databse Technical Disclosure, IP.com No. IPCOM000227630D, IP.com Electronic Publication Date: May 9, 2013 (3 pages).
(Continued)

*Primary Examiner* — Vanel Frenel
(74) *Attorney, Agent, or Firm* — F. Chau & Associates, LLC

(57) ABSTRACT

Systems and methods are described for supply chain vulnerability forecasting using external event data is described. The method may include identifying historic data from each entity of a plurality of entities connected in a supply chain, aggregating temporal-based information relating to the entities and to relations among the entities into one or more time periods based on the historic data, training a cognitive prediction model using the aggregated temporal-based information, generating a vulnerability score for each entity, generating a recommendation for at least one entity if the vulnerability score for the at least one entity is above a preset threshold, retraining the cognitive prediction model using changed data of the at least one entity, and adjusting the vulnerability score based on the retraining.

17 Claims, 5 Drawing Sheets

(51) Int. Cl.
*G06N 3/08* (2006.01)
*G06Q 10/06* (2012.01)
*G06N 20/00* (2019.01)

(58) Field of Classification Search
USPC .......................... 705/28, 1, 7, 500, 36 R, 38
See application file for complete search history.

(56) References Cited

U.S. PATENT DOCUMENTS

| | | | |
|---|---|---|---|
| 8,543,427 | B2 | 9/2013 | Noyes |
| 9,183,560 | B2 | 11/2015 | Abelow |
| 9,306,811 | B2 | 4/2016 | Watts et al. |
| 2009/0248488 | A1 | 10/2009 | Shah et al. |
| 2014/0018951 | A1 | 1/2014 | Linton et al. |
| 2014/0058775 | A1* | 2/2014 | Siig .................. G06Q 10/06 705/7.12 |
| 2014/0278731 | A1 | 9/2014 | Griffin et al. |
| 2015/0046363 | A1* | 2/2015 | McNamara ........ G06Q 10/0635 705/333 |
| 2015/0106280 | A1 | 4/2015 | Klavins |
| 2015/0381649 | A1* | 12/2015 | Schultz .................. G06Q 40/08 726/25 |
| 2018/0025281 | A1* | 1/2018 | Bose .................. G06N 5/04 706/12 |
| 2019/0066041 | A1* | 2/2019 | Hance .................... G05D 1/021 |
| 2019/0222594 | A1* | 7/2019 | Davis, III ............... H04L 47/10 |
| 2019/0244149 | A1* | 8/2019 | Krishnaswamy ........ G06N 5/02 |
| 2019/0260780 | A1* | 8/2019 | Dunn .................... G06N 20/00 |
| 2020/0021620 | A1* | 1/2020 | Puratheppparambil ....................... H04L 63/205 |
| 2020/0143314 | A1* | 5/2020 | Bajaj ............. G06Q 10/063114 |

OTHER PUBLICATIONS

Ramasamy Selvaraju, "Climate risk assessment and management in agriculture", 2017, pp. 71-89.

Steven Jaffee, et al., "Rapid Agricultural Supply Chain Risk Assessment", Agriculture and Rural Development, Jun. 2008, (50 pages).

Disclosed Anonymously, "New System and Methods for Calculating Risk, Probabilities, Economic Cost, and Resiliency Through Scenario Analysis of Impact to a Jurisdiction from Expected and Unexpected Events", An IP.com Prior Art Database Technical Disclosure, IP.com No. IPCOM000242922D; IP.com Electronic Publication Date: Aug. 30, 2015 (6 pages).

Jane M. Muller, "Cultivating climate change resilience in agri-food systems: Responses to natural disasters and emerging climate risks in Queensland's fresh produce supply chains", The University of Queensland in 2017, School of Social Science (138 pages).

* cited by examiner

SUPPLY CHAIN FORECASTING SYSTEM

BACKGROUND

The following relates generally to supply chain vulnerability forecasting, and more specifically to vulnerability forecasting using external event data.

Agriculture supply chains are especially sensitive to many external elements, such as weather and climate factors, labor strikes, and infrastructure failures. These external elements can be even more disruptive to agriculture than for other industries. For example, climate events can lead of total crop losses across large areas.

Many systems for assessing supply chain vulnerability are insufficient for agricultural supply chains because they do not adequately take these factors into account. This can result in reduced accuracy of supply chain vulnerability assessments, which can ultimately lead to inadequate or misplaced investment in agricultural supply chains as well as unnecessary loss of agricultural goods.

SUMMARY

A method for vulnerability forecasting using external event data is described. The method may include identifying historic data from each entity of a plurality of entities connected in a supply chain, aggregating temporal-based information relating to the entities and to relations among the entities into one or more time periods based on the historic data, training a cognitive prediction model using the aggregated temporal-based information, generating a vulnerability score for each entity, generating a recommendation for at least one entity if the vulnerability score for the at least one entity is above a preset threshold, retraining the cognitive prediction model using changed data of the at least one entity, and adjusting the vulnerability score based on the retraining.

An apparatus for supply chain vulnerability forecasting is described. The apparatus may include a processor, memory in electronic communication with the processor, and instructions stored in the memory. The instructions may be operable to cause the processor to identify historic data from each entity of a plurality of entities connected in a supply chain, aggregate temporal-based information relating to the entities and to relations among the entities into one or more time periods based on the historic data, train a cognitive prediction model using the aggregated temporal-based information, generate a vulnerability score for each entity, generate a recommendation for at least one entity if the vulnerability score for the at least one entity is above a preset threshold, retrain the cognitive prediction model using changed data of the at least one entity, and adjust the vulnerability score based on the retraining.

A non-transitory computer readable medium storing code for supply chain vulnerability forecasting is described. In some examples, the code comprises instructions executable by a processor to: identify historic data from each entity of a plurality of entities connected in a supply chain, aggregate temporal-based information relating to the entities and to relations among the entities into one or more time periods based on the historic data, train a cognitive prediction model using the aggregated temporal-based information, generate a vulnerability score for each entity, generate a recommendation for at least one entity if the vulnerability score for the at least one entity is above a preset threshold, retrain the cognitive prediction model using changed data of the at least one entity, and adjust the vulnerability score based on the retraining.

In some examples of the method, apparatus, and non-transitory computer-readable medium described above, the historic data comprises at least one of weather information or market information corresponding to a selected time interval. Some examples of the method, apparatus, and non-transitory computer-readable medium described above may further include generating a network comprising a plurality of nodes and a plurality of edges, wherein the plurality of nodes represent the plurality of entities and the plurality of edges represent the relations among the entities. Some examples of the method, apparatus, and non-transitory computer-readable medium described above may further include assigning a weight to each of the plurality of edges based at least in part on the aggregation.

In some examples of the method, apparatus, and non-transitory computer-readable medium described above, the retraining is based on additional temporal-based information corresponding to a subsequent time interval after a selected time interval of the temporal-based information. In some examples of the method, apparatus, and non-transitory computer-readable medium described above, the cognitive prediction model includes a neural network.

In some examples of the method, apparatus, and non-transitory computer-readable medium described above, the cognitive prediction model includes a machine learning model. In some examples of the method, apparatus, and non-transitory computer-readable medium described above, the vulnerability score corresponds to a selected time interval in the future. In some examples of the method, apparatus, and non-transitory computer-readable medium described above, the historic data is processed by text mining algorithms.

Some examples of the method, apparatus, and non-transitory computer-readable medium described above may further include processing remote sensing data using georeferential tools and databases. In some examples of the method, apparatus, and non-transitory computer-readable medium described above, the aggregating includes use of internet of things (IoT) sensor data. In some examples of the method, apparatus, and non-transitory computer-readable medium described above, the changed data is based at least in part on the recommendation.

DETAILED DESCRIPTION

The present disclosure describes an improved system for assessing the vulnerability of a supply chain by taking into account historical data, relationships among supply chain entities. Historical data such as weather data, climate data, news, social media, market data and data related to the relationships among supply chain entities may be aggregated in a dependency network and used to train a cognitive model. The cognitive model may produce a vulnerability score for each entity in the supply chain. If an entity is found to have a high vulnerability, the system may recommend a mitigation strategy. By using historical data along with other vulnerability assessment factors, the vulnerability scores provided by the system may be more suitable for sectors such as agriculture that are particularly sensitive to external factors. For example, a shipping company may use the system disclosed herein to predict the likelihood of a transport company to deliver goods on time. As another example, a credit provider may use the system to asses if a farmer who received money (e.g., to plant for a season) is likely to pay back the loan. As yet another example, a company that transports agricultural products (e.g., from farm to port for export) may use the system to predict the risk of losing jobs due to a full loss of crops. In addition to these examples, many other uses for the vulnerability assessment system are possible in various industries such as agriculture, banking, insurance, credit, and logistics. In general, any entity related to the supply chain network could be interested in minimizing risks and maximize gains by applying a more accurate score prediction model to members of the network. This may result in a more efficient supply chain, a higher agricultural yield, and lower prices for consumers.

Figure 1:
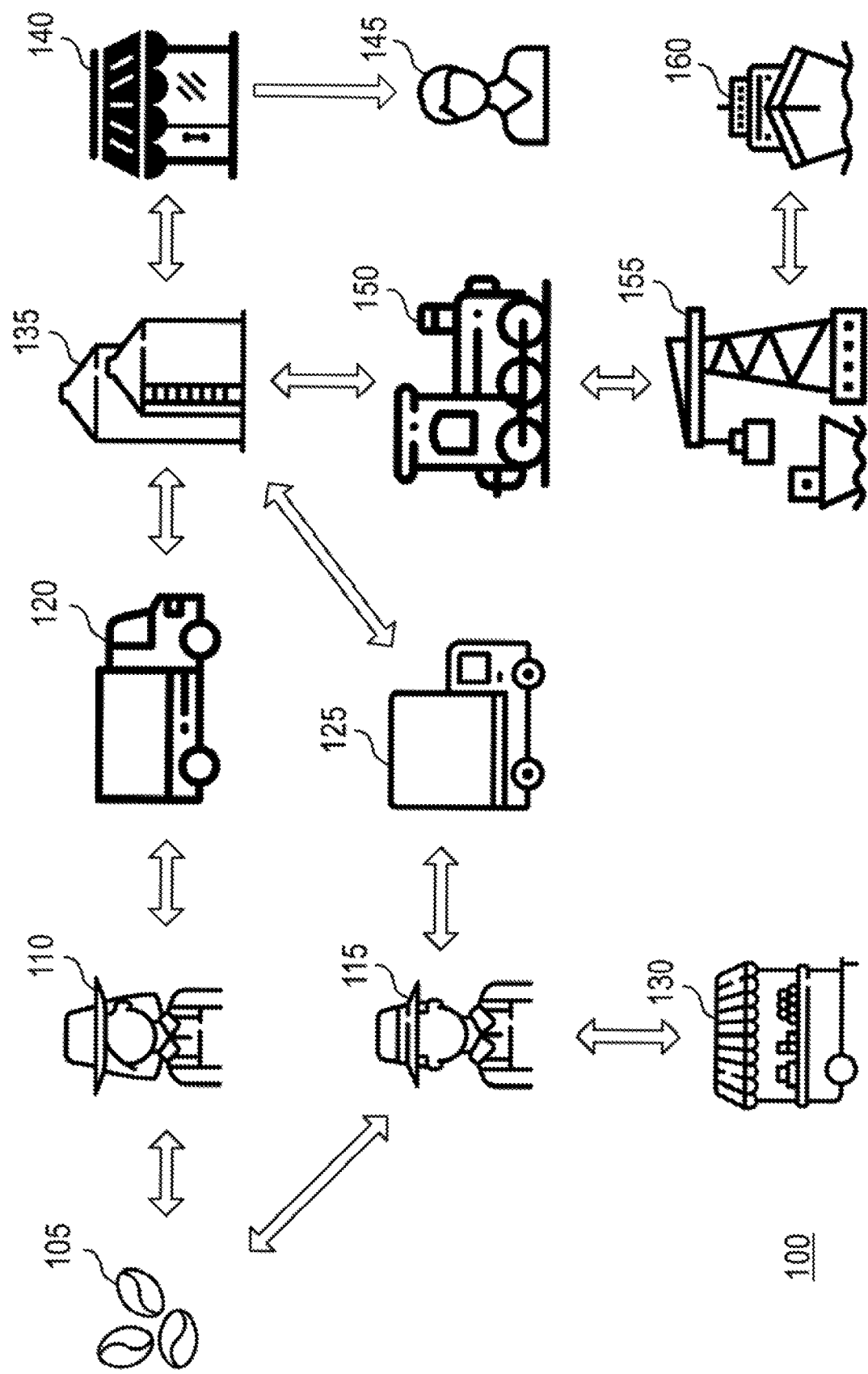
FIG. 1 shows an example of an agricultural supply chain in accordance with aspects of the present disclosure.

FIG. 1 shows an example of an agricultural supply chain 100 in accordance with aspects of the present disclosure. A supply chain 100 may represent the sequence of processes and entities involved in the production and distribution of a commodity, such as an agricultural commodity. The entities that perform the different roles in the supply chain 100 may represent individuals or corporate entities, and in some cases a single entity may perform multiple roles in the supply chain 100.

Supply chain 100 may be an example of, or include aspects of, the corresponding elements described with reference to FIG. 2. Supply chain 100 may include seed supplier 105, which can sell seed to different farmers, including first farmer 110 and second farmer 115. Each farmer may use different ground transportation, such as first ground transport 120 and second ground transport 125. In this case, the supply chain shows the use of only one storage provider 135. However, multiple storage providers 135 may be a part of the agricultural supply chain 100. One farmer 115 may also sell products direct to farmers market 130. The grocery store 140 buys items from storage provider 135, which may export produce using heavy transport 150, port 155, and ocean transport 160. On the other hand, final consumer 145 acquires products from grocery store 140.

A seed supplier 105 is an example of an entity in a supply chain 100. The seed supplier 105 may grow crops specifically for harvesting seeds to sell to other producers of that crop. In some cases, the seed supplier 105 purchases seeds from other entities and distributes them to farmers. A seed supplier 105 may provide seeds to multiple farmers. In the example shown here, the seed supplier 105 provides seed for a first farmer 110 and a second farmer 115. In some cases, the different producers operate at different scales. For example, the first farmer 110 may represent a large agricultural conglomerate while the second farmer 115 operates a family farm or a subsistence farm.

The first farmer 110 may utilize a first ground transport 120 to get produce to market. The second farmer 115 may utilize a second ground transport 125 to get produce to market. In addition to transporting produce via the second ground transport 125, the second farmer 115 may also directly transport a portion of their produce to a local farmers market 130.

The first ground transport 120 and the second ground transport 125 may transport produce to and from a storage provider 135. For example, a farm collective may operate a combined grain silo for multiple farmers. In some cases, the storage provider 135 may also operate as an aggregator and distributor of agricultural produce.

The storage provider 135 may provide produce to one or more grocery stores 140 or other retail outlets. The grocery store 140 may provide food directly to the consumer 145. In some cases, the storage provider 135 may also provide a portion of the stored produce to a heavy transport 150, such as train operator, for transportation over long distances. For example, the heavy transport 150 may convey produce from the storage provider 135 to a port 155 for transoceanic export.

From the port 155, an ocean transport 160 may convey the produce across the ocean. In some cases, the ocean transport 160 may offload the produce at another port 155 (not shown), where the produce may become part of another supply chain 100.

Seed supplier 105, First farmer 110, Second farmer 115, First ground transport 120, Second ground transport 125, Farmers market 130, Storage provider 135, Grocery store 140, Consumer 145, Heavy transport 150, Port 155, and Ocean transport 160 may be examples of, or include aspects of, the corresponding elements described with reference to FIG. 2.

Figure 2:
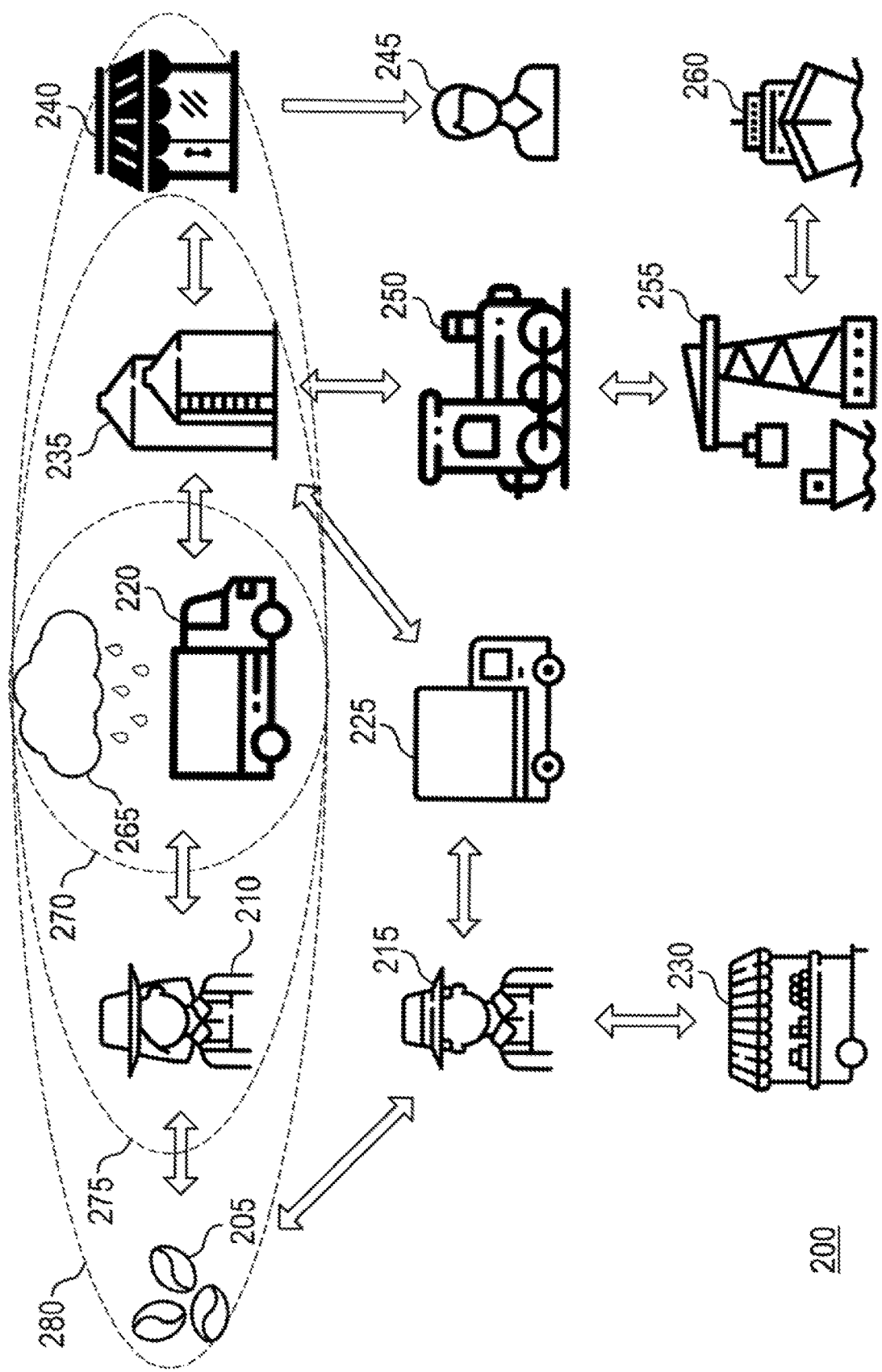
FIG. 2 shows an example of a modified agricultural supply chain after a disruptive event in accordance with aspects of the present disclosure.

FIG. 2 shows an example of a modified agricultural supply chain 200 after a disruptive event in accordance with aspects of the present disclosure. Supply chain 200 may be an example of, or include aspects of, the corresponding elements described with reference to FIG. 1. Supply chain 200 may include seed supplier 205, first farmer 210, second farmer 215, first ground transport 220, second ground transport 225, farmers market 230, storage provider 235, grocery store 240, consumer 245, heavy transport 250, port 255, ocean transport 260, external event 265, first order impact 270, second order impact 275, and third order impact 280.

In some cases, a supply chain 200 is impacted by an external event 265. The external event 265 may be a weather event, a labor strike, a political event, or another event that is out of the control of the entities of the supply chain 200. In the example shown, the external event 265 may directly impact the first ground transport 220. For example, a weather event may render a trade route of the first ground transport 220 impassable. As a result, other entities of the supply chain 200 may be impacted at various levels.

At first order, the first ground transport 220 is directly impacted by the external event 265. Then, at second order, the entities that interact directly with the first ground transport 220 may be impacted. For example, the first farmer 210 may be left without a way to transport produce to market. Similarly, the storage provider 235 may not receive as much produce.

The second order impact 275 may then propagate throughout the supply chain 200. As shown here, the entities that interact with the first farmer 210 and the storage provider 235 may experience a third order impact 280. For example, the seed supplier 205 may experience less demand for seeds if the first farmer 210 experiences financial difficulties due to the lack of transportation to market. The grocery store 240 may have trouble acquiring produce. In some cases, the heavy transport 25, and the second ground transport 225 may also experience different market conditions due to the reduced availability of produce at the storage provider 235 (although they are not shown within the third order impact 280 here).

Seed supplier 205, First farmer 210, Second farmer 215, First ground transport 220, Second ground transport 225, Farmers market 230, Storage provider 235, Grocery store 240, Consumer 245, Heavy transport 250, Port 255, and Ocean transport 260 may be examples of, or include aspects of, the corresponding elements described with reference to FIG. 1.

Figure 3:
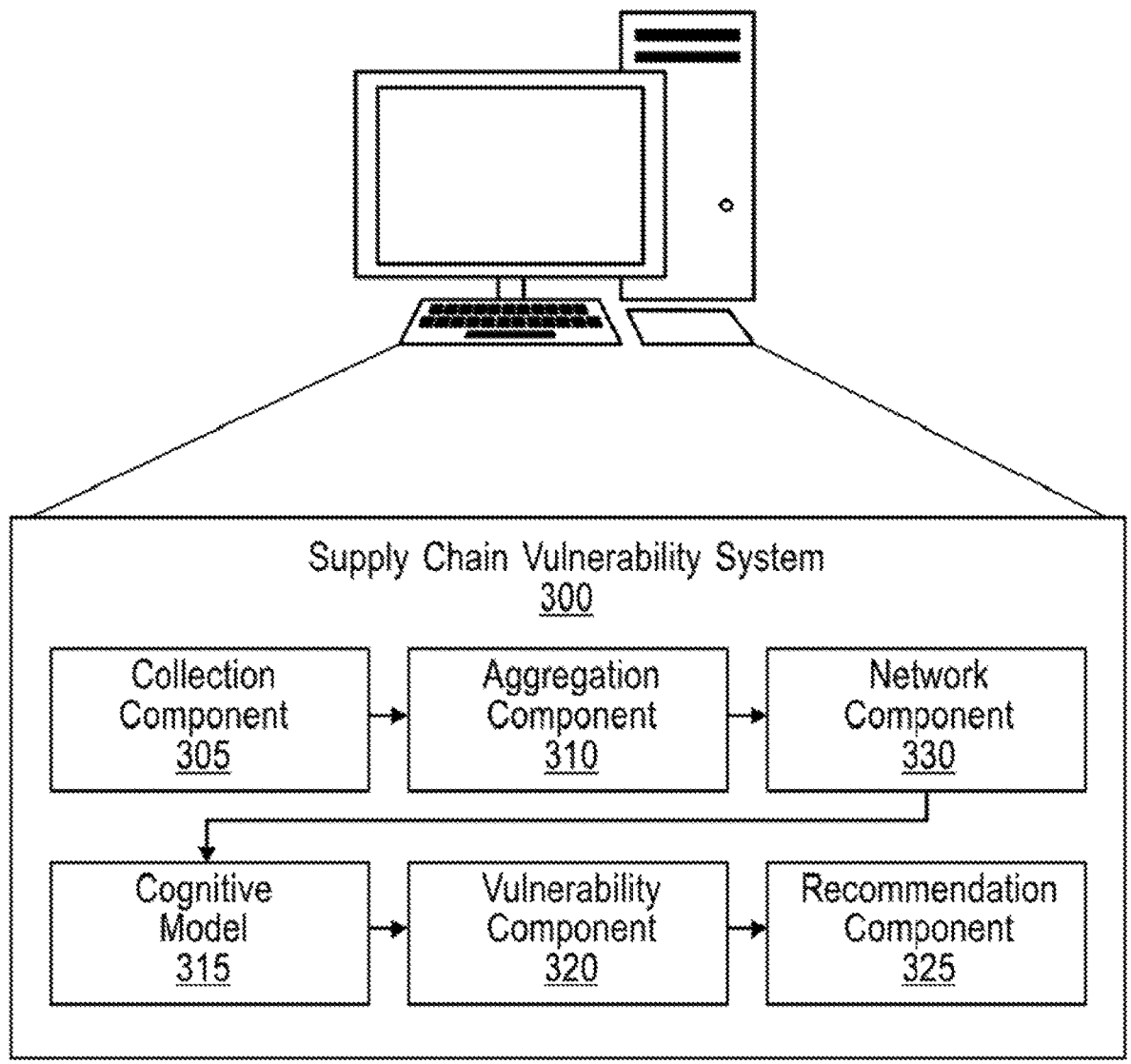
FIG. 3 shows an example of a supply chain vulnerability system in accordance with aspects of the present disclosure.

FIG. 3 shows an example of a supply chain vulnerability system 300 in accordance with aspects of the present disclosure. Supply chain vulnerability system 300 may include collection component 305, aggregation component 310, cognitive model 315, vulnerability component 320, recommendation component 325, and network component 330.

A supply chain vulnerability system 300 may first collect and/or identify available data from each entity of a supply chain (e.g., the supply chains described in FIGS. 1 and 2) in each time period, as well as identify the connections among each entity over time. For example, historical data may be used to predict the extent to which a disruption to one entity will propagate to other connected entities.

Examples of data that may be collected include: weather/climate data (like temperature, humidity, wind, precipitation & lightening forecast), natural disaster data statistical, remote sensing imagery, price and other market data & historical risk data, supply chain network data about the entity information (e.g., from official news website, social media, etc.) Each type of data may be processed according to a unique data structure for that type of data. For instance, text data may be processed with Natural Language Processing (NLP) methods or text mining algorithms for topic detection; weather, climate and remote sensing data may be processed with geo-referential tools and databases then fed into physical/statistical models.

For each time interval (e.g., monthly, yearly or any other time granularity that makes sense for the problem) or harvest season, the supply chain vulnerability system 300 may aggregate temporally all data available. Data aggregation for a given time period may include building a network and collapsing (i.e., summarizing) all the information that relates to that period. For instance, for a given season, the supply chain vulnerability system 300 may aggregate information about the volume of rainfall and temperature ranges (during the plant season, monthly or quarterly, sellers and buyers behavior in the supply chain, and any public or acquired economic indicators about the market in that period.

Once the data is aggregated, the supply chain vulnerability system 300 may generate a Weighted Entity Network model for each time. That is, the system may build a network for each time period, where the nodes are the entities in each period of time and the edges are the relations among the entities. For example, if the first ground transport was used by the first farmer, and conveyed produce to the storage provider, each of these entities would be a node, and the connections between them would be edges. In some examples, the volume or cost of the product or the shipping may be represented as edge weights. The edges may also contain the date of the shipment as additional weight for such edge. In one embodiment, the edge weights may range from 0 to 1, with 0 representing the least amount of dependency between two nodes and 1 representing the highest level of dependency between two nodes.

Once the data to generate the network model has been gathered, the supply chain vulnerability system 300 may generate a cognitive model 315. This cognitive model 315 may be implemented as any supervised machine learning model that can use the network structure over time. One example of a cognitive model 315 would be a neural network. The past snapshots of the supply chain, (i.e., the historical data), are used to train the cognitive model by applying past known causes and tuning the (also known) effects. Once the model is trained, the network 315 may facilitate predictions for the supply chain based on the aggregated historical data. In one example, the cognitive model is a neural network that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

Once the cognitive model 315 is trained, the supply chain vulnerability system 300 may compute a vulnerability score for each entity. The score may be an output of an algorithm based on the result of training the cognitive model and the network 315). In some cases, the vulnerability score is also dependent on a time variable. The vulnerability score may represent the propensity of an entity to have a vulnerability or a failure in the future. The cognitive model 315 may compute the vulnerability score of each entity of that supply chain for a given period in the future. In one embodiment, the vulnerability score may take a value in the range of 0 to 1 for each time period, where 0 represents no risk of failure, and 1 represents the highest level of certainty that a failure is likely to occur.

In some cases, the supply chain vulnerability system 300 may make one or more recommendations for a mitigation strategy. For example, the supply chain vulnerability system 300 may determine whether the vulnerability score for a particular entity is above (or below) a threshold, and if so, recommend ways to mitigate the impact of an external event. Such threshold may be configurable and tunable for specific time and situation, i.e. the threshold is customer defined and adjustable. For example, if the threshold is set to 0.8, a mitigation strategy would be generated for one or more combination of time periods, entities, and potentially disruptive events if the vulnerability score associated with the entity during that time period and event is greater than 0.8.

In some examples, the recommendations are based on determining how sensitive the vulnerability score of a particular entity is to different variables in the model. For example, if a first farmer is predicted to have difficulties in the near future because of rainfall volume, the system can recommend other possible farms or anticipate the extra costs for that part of the chain.

A higher vulnerability score indicates that the chance that something goes wrong is higher. Since the vulnerability score is time dependent and connected with events, the recommendations may also be associated with an event. For instance, a strike would result in a recommendation of ground transportation along another route. Or in the case of future high rainfall volume, a recommendation may be for a farmer to harvest before the anticipated weather event.

Once the supply chain vulnerability system 300 develops a vulnerability score and the accompanying recommendations, the score may be fed back in the system to update the current model. In some cases, the recommendations may be implemented by making real-world changes to the supply chain.

After the vulnerability scores and adjustments are processed and fed back into the system, additional data may also be collected based on information collected as a result of identifying vulnerable elements of the supply chain, and as a consequence of changes made based on the recommendations of the supply chain vulnerability system 300. In some cases, private data may also be input into the system including capacity information, product information, internet of things (IoT) data (e.g., humidity of the soil, wind direction), cost and revenue data, and other private information.

After the additional information is collected and aggregated with the existing data set, the cognitive model 315 may be re-trained. In some cases, new vulnerability scores may be generated on a periodic basis, or continuously updated as new data become available.

Collection component 305 may identify historic data from each entity of a plurality of entities connected in a supply chain. Collection component 305 may also process remote sensing data using geo-referential tools and databases. In some examples, the historic data is processed by text mining algorithms.

Aggregation component 310 may aggregate temporal-based information relating to the entities and to relations among the entities into one or more time periods based on the historic data. In some examples, the historic data comprises at least one of weather information or market information corresponding to a selected time interval. In some examples, the cognitive prediction model includes a machine learning model.

Cognitive model 315 may train a cognitive prediction model using the aggregated temporal-based information. Cognitive model 315 may also adjust the vulnerability score based on the retraining. In some examples, the retraining is based on additional temporal-based information corresponding to a subsequent time interval after a selected time interval of the temporal-based information. In some examples, the aggregating includes use of IoT sensor data.

In some examples, the cognitive model 315 includes a neural network. A neural network is a type of computer algorithm that is capable of learning specific patterns without being explicitly programmed, but through iterations over known data. The example below illustrates an example of neural network that takes several inputs such as meteorological, economic, social media and other types of data and predicts a vulnerability score for the supply chain.

Vulnerability component 320 may generate a vulnerability score for each entity. In some examples, the vulnerability score corresponds to a selected time interval in the future. Recommendation component 325 may generate a recommendation for at least one entity if the vulnerability score for the at least one entity is above a preset threshold.

Network component 330 may generate a network comprising a plurality of nodes and a plurality of edges, wherein the nodes represent the plurality of entities and the edges represent the relations among the entities.

In one embodiment, the supply chain vulnerability system 300 may identify historic input data and historic vulnerability data for a plurality of entities in a supply chain and assign time periods to the historic input data and the historic vulnerability data. The supply chain vulnerability system 300 may then train cognitive model 315 using the historic input data and the historic vulnerability data based on the assigned time periods. The cognitive model 315 may then be used to generate one or more vulnerability scores for at least one of the plurality of entities in the supply chain, where each of the one or more vulnerability scores corresponds to a future time period. If the vulnerability scores exceed a threshold, the supply chain vulnerability system 300 may generate a mitigation recommendation based at least in part on the determination.

Figure 4:
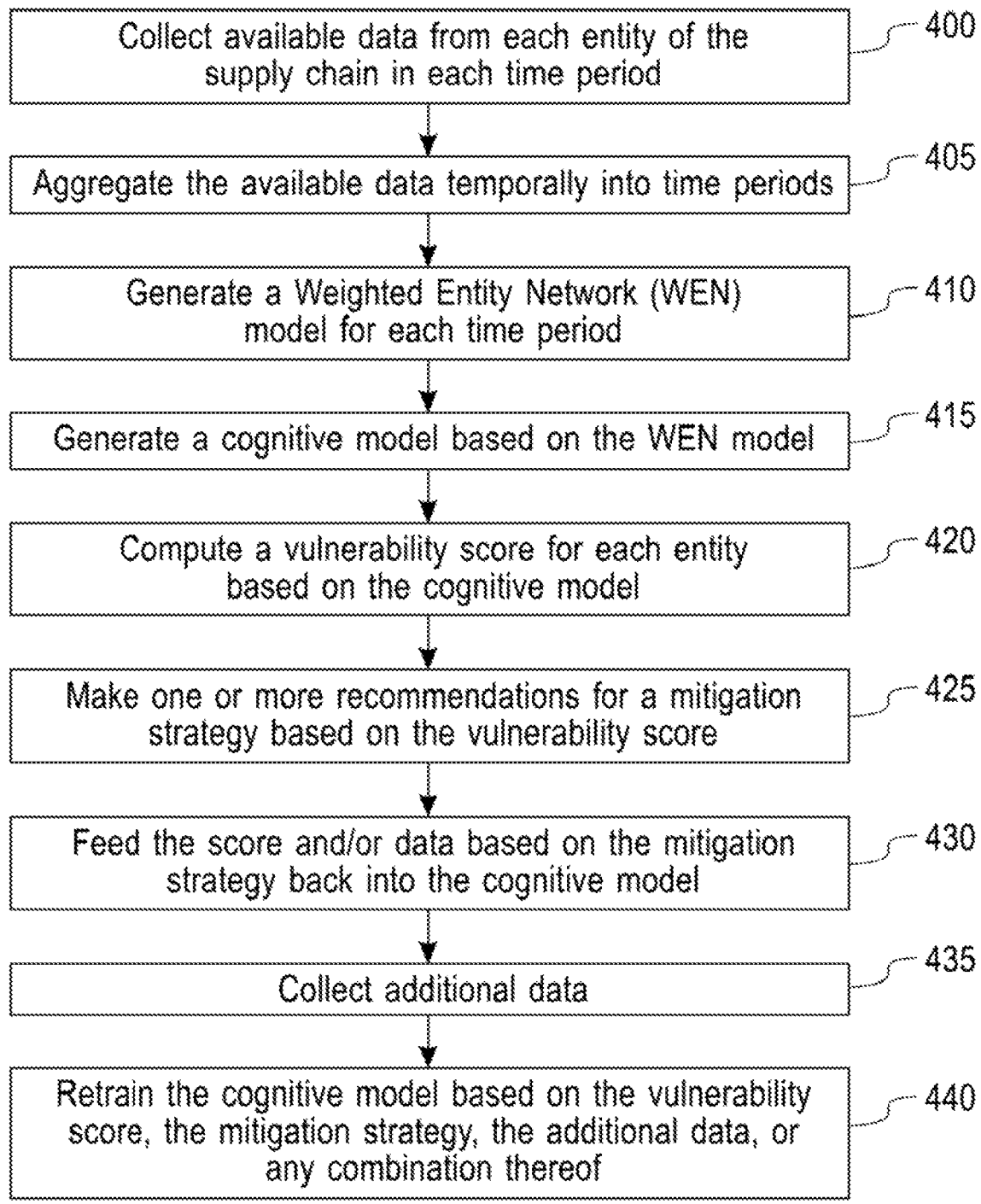
FIGS. 4 through 5 show examples of a process for assessing the vulnerability of an agricultural supply chain in accordance with aspects of the present disclosure.

FIG. 4 shows an example of a process for assessing the vulnerability of an agricultural supply chain in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

After the collection of historic data, the supply chain vulnerability system may aggregate and summarize (e.g. using a graph or time series) the information about each supply chain entity. For example, for a given season, it should aggregate all the information about the volume of rainfall, the ranges of temperature, the sellers and the buyers in the supply chain, any economic indicator about the market in that period, etc.

The data may be collected using geo-reference tools and database (i.e., software used in processing and storing data that has a geolocation attribute associated). These tools include software capable of handling large number of different datasets with specific characteristics (like projection or spatial resolution) over the same map allowing users to perform analytics and draw conclusions. Geospatial databases are especially useful to allow for quick retrieval of georeferenced information in an operational environment. All of the data types used in this invention that have geolocation associated will be stored and processed by these tools, such as meteorological data.

The cognitive model may be trained using the aggregated information from the previous step. The model will perform the future predictions for the considered supply chain, and generate a vulnerability score that reflects how vulnerable each entity will be in given future time. As new data for each entity is available the model may be update and then re-trained.

The cognitive model may be based on a graph network. Example of entities that could be represented in nodes include farmers (i.e., the entity (person or company) responsible for managing the farm and the first steps of the food production). Different types of farmers can be part of the network, according to what, how or where they produce. The network may also include transporters (i.e., the entity that transports the goods produced by the farmer to different entities in the networks). Different types of transporters can be present in the network (like truck drivers, logistic companies, ships, etc). The model nodes may also include buyers (i.e., the entity who commercialize the goods. Weights are numerical values associated with each edge and can represent for example costs, lengths, capacities or other features.

Thus, at step 400, the system may collect available data from each entity of the supply chain in each time period. In some cases, the operations of this step may refer to, or be performed by, a collection component as described with reference to FIG. 3.

At step 405, the system may aggregate the available data temporally into time periods. In some cases, the operations of this step may refer to, or be performed by, an aggregation component as described with reference to FIG. 3.

At step 410, the system may generate a Weighted Entity Network (WEN) model for each time period. In some cases, the operations of this step may refer to, or be performed by, a network component as described with reference to FIG. 3.

At step 415, the system may generate a cognitive model based on the WEN model. In some cases, the operations of this step may refer to, or be performed by, a cognitive model as described with reference to FIG. 3.

At step 420, the system may compute a vulnerability score for each entity based on the cognitive model. In some cases, the operations of this step may refer to, or be performed by, a vulnerability component as described with reference to FIG. 3.

At step 425, the system may make one or more recommendations for a mitigation strategy based on the vulnerability score. In some cases, the operations of this step may refer to, or be performed by, a recommendation component as described with reference to FIG. 3.

At step 430, the system may feed the score and/or data based on the mitigation strategy back into the cognitive model. In some cases, the operations of this step may refer to, or be performed by, a cognitive model as described with reference to FIG. 3.

At step 435, the system may collect additional data. In some cases, the operations of this step may refer to, or be performed by, a collection component as described with reference to FIG. 3.

At step 440, the system may retrain the cognitive model based on the vulnerability score, the mitigation strategy, the additional data, or any combination thereof. In some cases, the operations of this step may refer to, or be performed by, a cognitive model as described with reference to FIG. 3.

Figure 5:
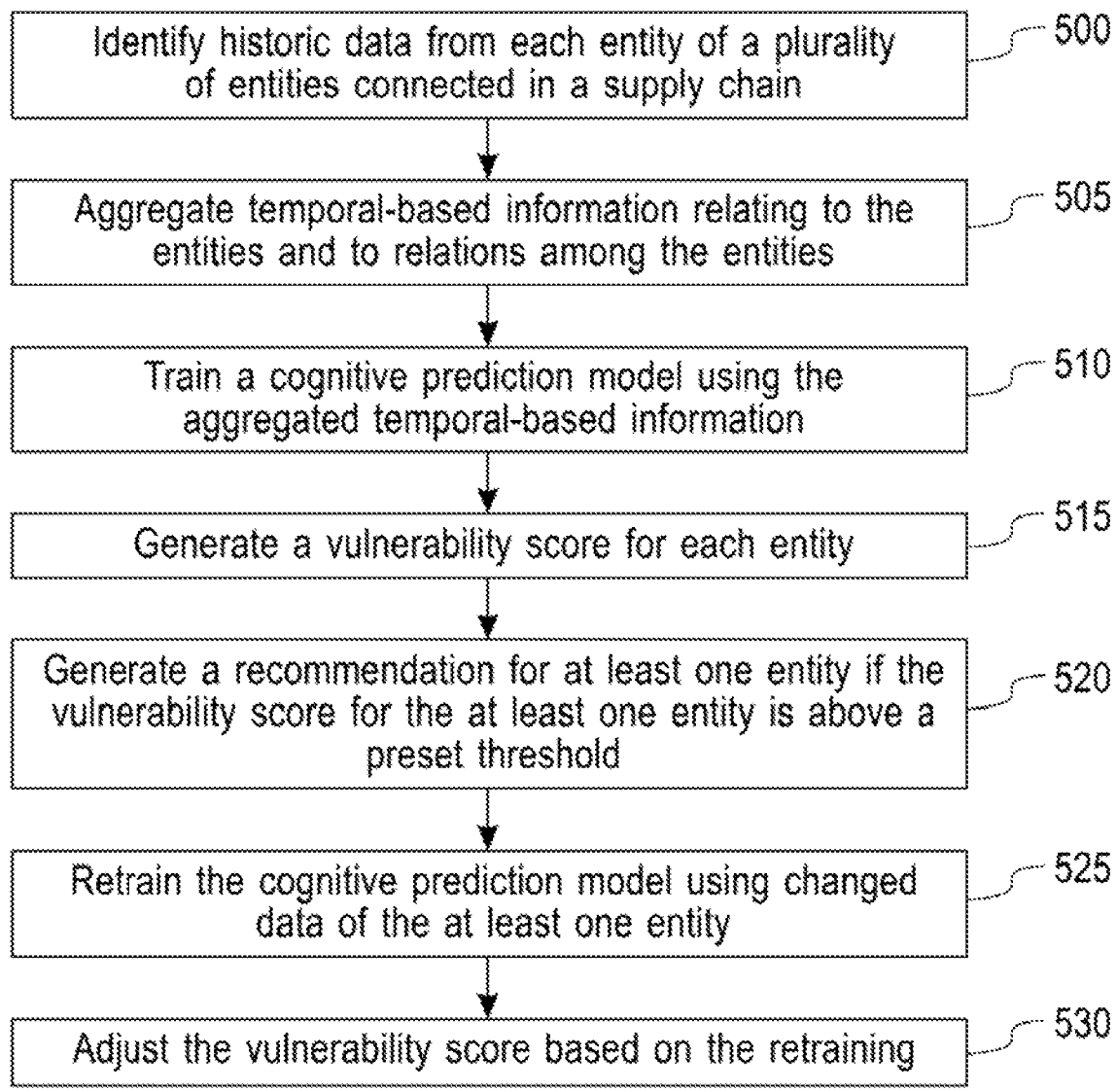

FIG. 5 shows an example of a process for assessing the vulnerability of an agricultural supply chain in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system may identify historic data from each entity of a plurality of entities connected in a supply chain. In some cases, the operations of this step may refer to, or be performed by, a collection component as described with reference to FIG. 3.

At step 505, the system may aggregate temporal-based information relating to the entities and to relations among the entities into one or more time periods based on the historic data. In some cases, the operations of this step may refer to, or be performed by, an aggregation component as described with reference to FIG. 3.

At step 510, the system may train a cognitive prediction model using the aggregated temporal-based information. In some cases, the operations of this step may refer to, or be performed by, a cognitive model as described with reference to FIG. 3.

At step 515, the system may generate a vulnerability score for each entity. In some cases, the operations of this step may refer to, or be performed by, a vulnerability component as described with reference to FIG. 3.

At step 520, the system may generate a recommendation for at least one entity if the vulnerability score for the at least one entity is above a preset threshold. In some cases, the operations of this step may refer to, or be performed by, a recommendation component as described with reference to FIG. 3.

At step 525, the system may retrain the cognitive prediction model using changed data of the at least one entity.

At step 530, the system may adjust the vulnerability score based on the retraining. In some cases, the operations of this step may refer to, or be performed by, a cognitive model as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for supply chain vulnerability forecasting, comprising:
    identifying historic data including historic input data and historic vulnerability data relating to entities connected in a supply chain;
    aggregating temporal-based information relating to the entities and to relations among the entities into time periods based on the historic data, wherein the temporal-based information is aggregated by assigning the historic input data and the historic vulnerability data to the time periods;
    training a cognitive prediction model using the aggregated temporal-based information based on historic input data and the historic vulnerability data being assigned to the time periods, wherein the cognitive prediction model comprises a neural network;
    generating a vulnerability score for each entity using the cognitive prediction model;
    generating a recommendation for at least one entity if the vulnerability score for the at least one entity is above a preset threshold;
    retraining the cognitive prediction model using changed data of the at least one entity, wherein the changed data is based at least in part on a change to the supply chain as a consequence of the recommendation; and
    adjusting the vulnerability score based on the retraining.

2. The method of claim 1, wherein:
    the historic data comprises at least one of weather information or market information corresponding to a selected time interval.

3. The method of claim 1, further comprising:
    generating a network comprising a plurality of nodes and a plurality of edges for each time period, wherein the plurality of nodes in each generated network represent the plurality of entities in a corresponding time period and the plurality of edges represent the relations among the entities; and
    assigning a weight to each of the plurality of edges based at least in part on the aggregation.

4. The method of claim 1, wherein:
    the retraining is based on additional temporal-based information corresponding to a subsequent time interval after a selected time interval of the temporal-based information.

5. The method of claim 1, wherein:
    the cognitive prediction model includes a machine learning model.

6. The method of claim 1, wherein:
    the vulnerability score corresponds to a selected time interval in the future.

7. The method of claim 1, wherein:
    the historic data is processed by text mining algorithms.

8. The method of claim 1, further comprising:
    processing remote sensing data using geo-referential tools and databases.

9. The method of claim 1, wherein:
    the aggregating includes use of internet of things (IoT) sensor data.

10. An apparatus for supply chain vulnerability forecasting, comprising: a processor and a memory storing instructions and in electronic communication with the processor, the processor being configured to execute the instructions to:
    identify historic data including historic input data and historic vulnerability data relating to entities connected in a supply chain;
    aggregate temporal-based information relating to the entities and to relations among the entities into one or more time periods based on the historic data, wherein the temporal-based information is aggregated by assigning the historic input data and the historic vulnerability data to the time periods;
    train a cognitive prediction model using the aggregated temporal-based information, wherein the cognitive prediction model comprises a neural network;
    generate a vulnerability score for each entity using the cognitive prediction model;
    generate a recommendation for at least one entity if the vulnerability score for the at least one entity is above a preset threshold;
    retrain the cognitive prediction model using changed data of the at least one entity, wherein the changed data is based at least in part on a change to the supply chain as a consequence of the recommendation; and
    adjust the vulnerability score based on the retraining.

11. The apparatus of claim 10, wherein:
    the historic data comprises at least one of weather information or market information corresponding to a selected time interval.

12. The apparatus of claim 10, the processor being further configured to execute the instructions to:
    generate a network comprising a plurality of nodes and a plurality of edges, wherein the plurality of nodes represent the plurality of entities and the plurality of edges represent the relations among the entities; and
    assign a weight to each of the plurality of edges based at least in part on the aggregation.

13. The apparatus of claim 10, wherein:
    the retraining is based on additional temporal-based information corresponding to a subsequent time interval after a selected time interval of the temporal-based information.

14. A non-transitory computer readable medium storing code for supply chain vulnerability forecasting, the code comprising instructions executable by a processor to:
    identifying historic input data and historic vulnerability data for a plurality of entities in a supply chain;
    assigning time periods to the historic input data and the historic vulnerability data;
    training a cognitive prediction model using the historic input data and the historic vulnerability data based on the time periods assigned to the historic input data and the historic vulnerability data, wherein the cognitive prediction model comprises a neural network;
    generating one or more vulnerability scores for at least one of the plurality of entities in the supply chain using the cognitive prediction model, wherein each of the one or more vulnerability scores corresponds to a future time period.

15. The non-transitory computer-readable medium of claim 14, the code further comprising instructions executable by the processor to:
    determining that the one or more vulnerability scores exceed a threshold; and generating a mitigation recommendation based at least in part on the determination that the one or more vulnerability scores exceed the threshold.

16. The non-transitory computer-readable medium of claim 14, the code further comprising instructions executable by the processor to:

generate a network comprising a plurality of nodes and a plurality of edges, wherein the plurality of nodes represent the plurality of entities and the plurality of edges represent the relations among the entities; and assign a weight to each of the plurality of edges based at least in part on the aggregation.

17. The non-transitory computer-readable medium of claim 14, wherein the training is based on additional temporal-based information corresponding to a subsequent time interval after a selected time interval of the temporal-based information.

\* \* \* \* \*